INVENTOR.
HUGH P. McADAMS, Jr.

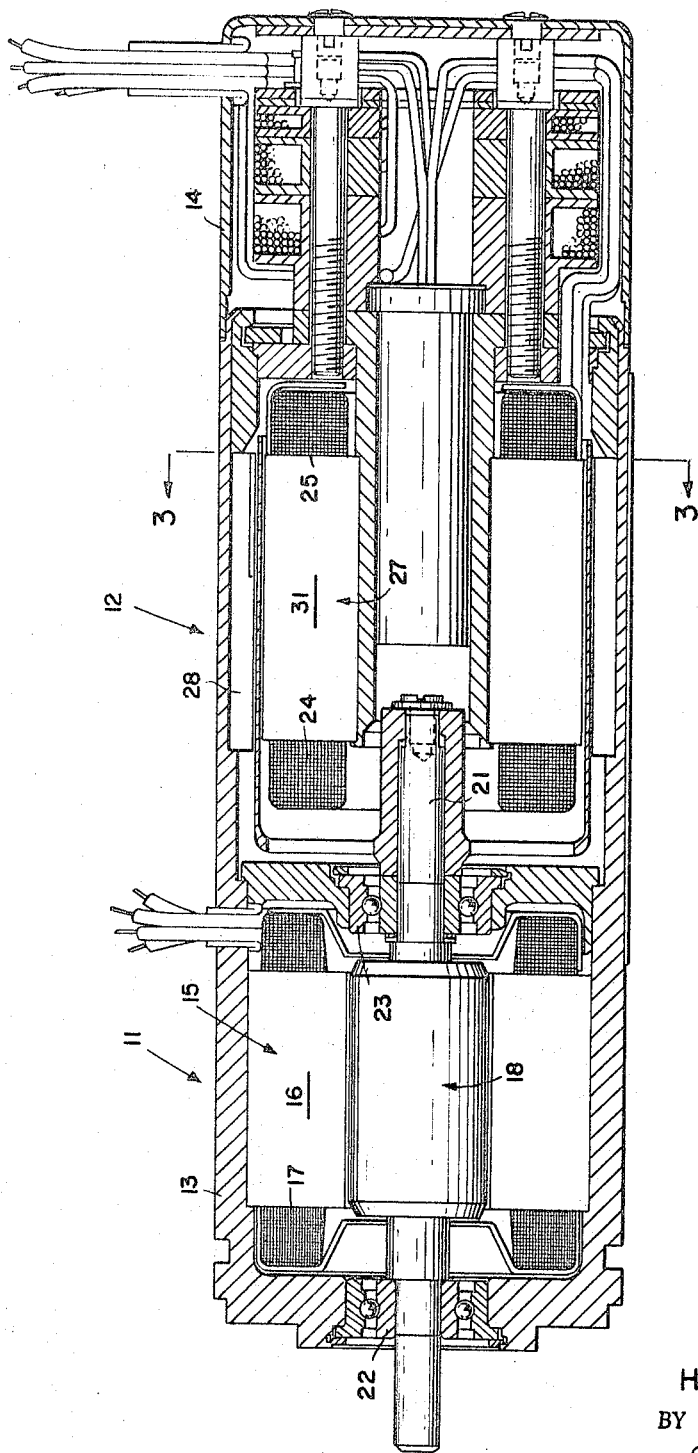

United States Patent Office 3,332,005
Patented July 18, 1967

3,332,005
TACHOMETER
Hugh P. McAdams, Jr., Drexel Hill, Pa., assignor to Clifton Precision Products Division of Litton Precision Products, Inc., Clifton Heights, Pa., a corporation of Delaware
Filed Jan. 21, 1964, Ser. No. 339,846
6 Claims. (Cl. 322—51)

This invention relates to improvements in a tachometer, and more particularly concerns a tachometer of such construction that the fundamental null voltage error is substantially eliminated.

Ideally, the output voltage of a tachometer is directly proportional to the energizing voltage and to the speed of the tachometer shaft.

However, in practice, the output voltage includes three components:

(1) A fundamental frequency component having a frequency the same as that of the major excitation voltage,
(2) a harmonic component having frequencies which are harmonics of the major excitation voltage,
(3) a sideband component having frequencies which are sidebands of the major excitation voltage and whose frequencies may be computed from tachometer speed.

This invention is concerned with the fundamental frequency component having a frequency the same as that of the major excitation voltage.

The funndamental frequency component output voltage may be further broken down into two parts: (1) a speed sensitive voltage, and (2) a null voltage. This null voltage is an error voltage and may be though of as that portion of the output voltage which exists at zero velocity of the tachometer shaft. The fundamental null voltage has two components known, in the precision tachometer field, as the axis error voltage and the position error voltage.

Position error voltage is that portion of the fundamental null voltage which varies with the position of the rotary drag cup. The null voltage of a tachometer increases or decreases as the drag cup is rotated. In other words, a null voltage is cyclic during one rotation of the drag cup and comprises a series of alternate highs and lows.

Axis error voltage is that portion of the output voltage which is constant and does not vary with the speed of the rotor or its position. It is the voltage at the intersection of the speed versus output-voltage curve when the speed is equal to zero. The axis voltage may be thought of as consisting of two components relative to the time phase of the excitation voltage: an in-phase component and a quadrature component.

The axis error voltage is created by magnetic error caused by unbalance in the flux from the primary through the secondary winding, an unbalance either of magnitude and/or of phase; and/or the axis error voltage is an electrical error which is a residual error caused by cappacitive coupling from the primary winding to the secondary winding.

It is an object of this invention to correct and eliminate the axis error voltage, whether it be of magnetic or electrical origin, or both.

Other objects and advantages of the invention, including its simplicity and economy, as well as the ease with which it may be adapted to existing equipment, will further become apparent hereinafter and in the drawings, in which:

FIG. 1 is a view in section of a motor tachometer constructed in accordance with this invention;

Figure 3:
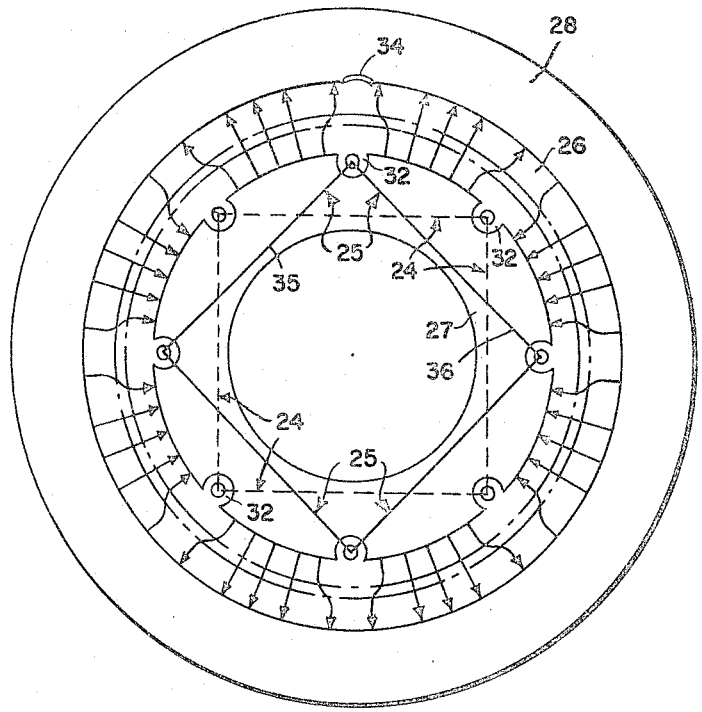
FIG. 3 is a view in section taken as indicated by the lines and arrows 3—3 which appear in FIG. 1.

Although specific terms are used in the following description for clarity, these teerms are intended to refer only to the structure shown in the drawings, and are not intended to define or limit the scope of the invention.

Turning now to the specific embodiment of the invention selected for illustration in the drawings, there is shown a motor tachometer assembly which includes a motor 11 and a tachometer 12. The assembly is enclosed in a cup-shaped housing 13 which has its open end closed by a can 14.

Motor 11 includes a stator 15 which has a stack 16 of electrical laminations and a winding 17, and a rotor 18 which has a shaft 21 supported in bearings 22 and 23.

Tachometer 12 includes a primary winding 24, a secondary winding 25 (see FIGS. 3 and 4) mounted 90 electrical degrees away from the primary winding, a rotary drag cup 26 which couples windings 24 and 25 when the cup is rotating, and trimming resistor means connected to primary winding 24 for reducing null voltage.

Tachometer 12 also includes a stator 27 on which primary winding 24 is mounted, and a flux return path member 28 which encircles stator 27 and provides an air gap therebetween.

Stator 27 has a stack 31 of annular laminations having radial slots 32. Primary winding 24 is supported on stator 27 and is distributed in slots 32 in the manner shown in FIG. 3 so as to lie in alternate slots. Secondary winding 25 is also supported on stator 27 and is distributed in the alternate slots 32 which are not occupied by primary winding 24 so that secondary winding 25 is in quadrature electrical spacing with primary winding 24.

Flux return path member 28 includes a stack of annular laminations which encircle stator 27 and provide the air gap in which rotatable drag cup 26 is positioned for coupling windings 24, 25 when drag cup 26 is rotating.

A means for adjusting the fundamental axis null is provided and comprises a trimming resistor 33 (FIGS. 2 and 4) which is connected to primary winding 24, and a discontinuity groove 34 (FIGS. 1 and 3).

The distincontinuity groove 34 extends longitudinally along member 28 for some distance.

Groove 34 is used to achieve a flux linkage which may be adjusted to compensate for unbalance in flux magnitube. As is shown in FIG. 3, groove 34 is positioned between opposing coils 35, 36 of secondary winding 25. A slight relative movement of groove 34 in either direction of rotation lessens the flux through one coil (for example, coil 35), and increases the flux in the other coil (coil 36). This results in a magnitude adjustment of the two opposing flux vectors. However, if the two opposing flux vectors are not at the same phase angle (zero degrees or 180 degrees), then the two flux vectors do not balance out because of the quadrature component.

The trimming resistor 33, which shunts coils in primary winding 24, affects the time phasing of the two opposing flux vectors and allows a complete balance of the flux vectors to occur.

Figure 2:
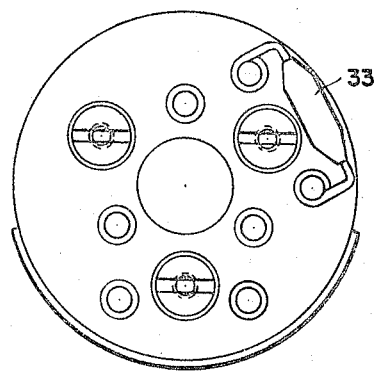
FIG. 2 is a view in elevation of the right end of the device of FIG. 1 with the cover can removed (shown before being wired)
Figure 4:
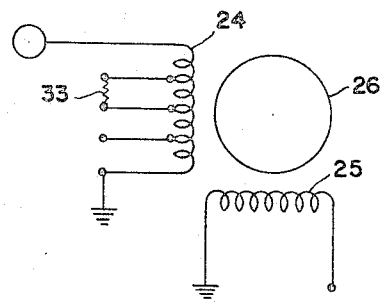
FIG. 4 is a diagrammatic view of the electrical circuit of the tachometer.

The schematic position of trimming resistor 33 on primary winding 24, is shown in FIGS. 2 and 4.

In assembling the tachometer 12, the adjustment procedure for minimizing the null voltage is as follows. Primary winding 24 is excited and readings are taken from secondary winding 25 as discontinuity groove 34 is placed at various positions between coils 35 and 36 (FIG. 3). Then the flux return path member 28 is secured, with groove 34 in the position which gives the lowest null voltage reading.

Next a variable resistance is connected across one of the coils of primary winding 24 and the amount of the resistance is varied until the null voltage reading is at a minimum. The above adjustment procedure is repeated a number of times to minimize this null. The resistance value is noted, and the variable resistance is removed. Then a resistance of the noted value is soldered across the coil.

The windings of the tachometer may comprise coils which are connected in series, or coils connected in parallel. Moreover, the coils may be skein wound in such a manner that one skein covers one pole set, that is, a north and a south pole. The skeins may be connected in series or in parallel, and the poles may be trimmed by adding a resistor, in accordance with the above described technique, to obtain phase adjustments.

It will be realized that a trimming resistor may be added across one or more coils of the primary winding, as necessary or as desired.

It is to be understood that the form of the invention herewith shown and described is to be taken as a presently preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

The claimed invention:

1. A tachometer comprising a primary winding, a secondary winding mounted 90 electrical degrees away from the primary winding, a rotary drag cup which couples the windings when the cup is rotating, and a trim resistor connected to the primary winding to vary the flux phasing in the primary winding.

2. A tachometer comprising a stator, a primary winding mounted on said stator, a flux return path member encircling said stator and providing an air gap therebetween, a secondary winding mounted 90 electrical degrees away from the primary winding, a rotatable drag cup positioned in said air gap for coupling said windings when said cup is rotating, and null voltage reducing means including a trimming resistor connected to the primary winding and a discontinuity groove formed in said flux return path member.

3. A tachometer comprising a stator, a primary winding mounted on said stator, a flux return path member counted concentric to the stator and providing an air gap therebetween, a secondary winding positioned at approximately 90 electrical degrees away from the primary winding, a rotatable drag cup positioned in said air gap for coupling said windings when said cup is rotating, and null voltage reducing means including a trimming resistor connected to the primary winding, said null voltage being reduced to a minimum by the rotative position of said return path member relative to said stator and by said trimming resistor.

4. A tachometer comprising a stator, a primary winding mouned on said stator, a flux return path member mounted concentric to the stator and providing an air gap therebetween, a secondary winding positioned at approximately 90 electrical degrees away from the primary winding, a rotatable drag cup positioned in said air gap for coupling said windings when said cup is rotating, said stator and flux return path member being made of iron, and null voltage reducing means including a trimming resistor connected to the primary winding for varying the flux phasing in said air gap and iron, said null voltage being reduced to a minimum by the rotative position of said return path member relative to said stator and by said trimming resistor.

5. A tachometer comprising a stator including a stack of annular laminations having radial slots, a primary winding supported on said stator and distributed in said slots, a secondary winding supported on said stator and distributed in said slots so that it is in quadrature electrical spacing with the primary winding, a flux return path member including a stack of annular laminations which encircle said stator and provide an air gap therebetween, a rotatable drag cup encircling said stator and positioned in said air gap for coupling the windings when the cup is rotating, trimming resistor means connected to the primary winding for adjusting the phase of the axis voltage to eliminate quadrature error, and discontinuity groove means formed in said flux return path member for adjusting the magnitude of the axis voltage to eliminate in-phase error.

6. A motor-tachometer comprising a rotor and a stator, and a tachometer including a stator having a stack of annular laminations having radial slots, a primary winding supported on said stator and distributed in said slots, a secondary winding supported on said stator and distributed in said slots so that it is in quadrature electrical spacing with the primary winding, a flux return path member including a stack of annular laminations which encircle said stator and provide an air gap therebetween, a rotatable drag cup encircling said stator and positioned in said air gap for coupling the windings when the cup is rotating, trimming resistor means connected to the primary winding for adjusting the phase of the axis voltage to eliminate quadrature error, and discontinuity groove means formed in said flux return path member for adjusting the magnitude of the axis voltage to eliminate in-phase error.

References Cited

UNITED STATES PATENTS

| | | |
|---|---|---|
| 1,695,035 | 12/1928 | Holler _____ 318—328 |
| 2,067,500 | 1/1937 | Morton _____ 318—328 |
| 2,657,348 | 10/1953 | Jarvis. |
| 2,671,180 | 3/1954 | Goldberg _____ 310—191 |
| 2,738,433 | 3/1956 | Schroeder et al. ____ 310—191 X |
| 2,917,690 | 12/1959 | Magaraci. |
| 2,996,650 | 8/1961 | Roberti et al. _____ 318—327 X |
| 3,042,820 | 7/1962 | Diamond _____ 310—191 X |
| 3,166,686 | 1/1965 | Mea _____ 310—162 X |

MILTON O. HIRSHFIELD, *Primary Examiner.*

J. J. SWARTZ, J. D. TRAMMELL, *Assistant Examiners.*